United States Patent [19]

Uchida et al.

[11] Patent Number: 4,909,411

[45] Date of Patent: Mar. 20, 1990

[54] CONTAINER

[75] Inventors: Yasuzo Uchida, Tokyo; Junji Yotsuyanagi; Otohiko Miyauchi, both of Kanagawa, all of Japan

[73] Assignee: Showa Denko Kabushiki Kaisha, Tokyo, Japan

[21] Appl. No.: 313,574

[22] Filed: Feb. 22, 1989

[51] Int. Cl.[4] ............................................. B65D 1/34
[52] U.S. Cl. ................................. 220/450; 220/453; 229/3.5 MF; 428/35.9
[58] Field of Search ................ 220/83, 450, 453, 458; 229/3.5 MF; 428/35.9, 36.7

[56] References Cited

U.S. PATENT DOCUMENTS

| | | | |
|---|---|---|---|
| 3,298,559 | 1/1967 | Lurie | 229/3.5 MF X |
| 4,278,716 | 7/1981 | Buchner et al. | 229/3.5 MF X |
| 4,333,601 | 6/1982 | Grimm | 229/3.5 MF X |
| 4,616,766 | 10/1986 | Miyauchi et al. | 220/450 |
| 4,766,018 | 8/1988 | Hinrichsen et al. | 428/35.9 |
| 4,810,541 | 3/1989 | Newman et al. | 220/453 X |

*Primary Examiner*—Steven M. Pollard
*Attorney, Agent, or Firm*—Sughrue, Mion, Zinn Macpeak & Seas

[57] ABSTRACT

In a can-shaped container comprising: a container body including a cup-shaped container base with a flange at its opening, the container base being formed by using a plate-shaped multi-layer base material made up of an intermediate layer and thermally weldable resin layers formed on both sides of the intermediate layer in such a manner that wrinkles are formed in the cylindrical wall, and an injected resin layer formed on the outer surface of the container base by injection molding in such a manner that the injected resin layer extends from the outer periphery of the flange of the container base, thus forming an injected resin flange, the two flanges forming a lid sealing region; and a lid thermally welded to the lid sealing region of the container body; the outer periphery of the flange of the container base is located at least 1 mm inwardly away from the outer periphery of the injected resin flange, and the sealing strength of the flange of the container base with the lid is greater than the sealing strength of the injected resin flange with the lid, whereby the container will never is broken or blasted when dropped or subjected to retort sterilization, and the lid can be readily peeled off when necessary.

4 Claims, 3 Drawing Sheets

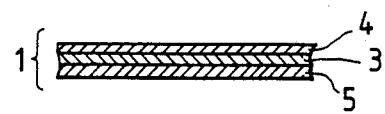
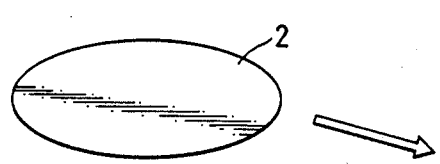
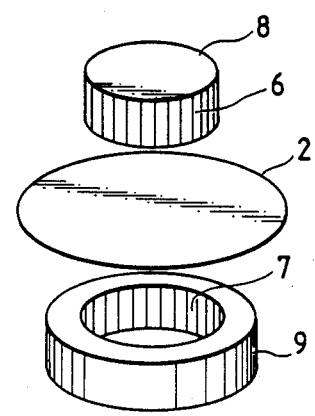
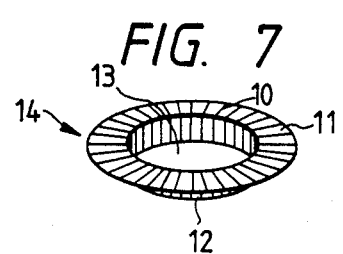
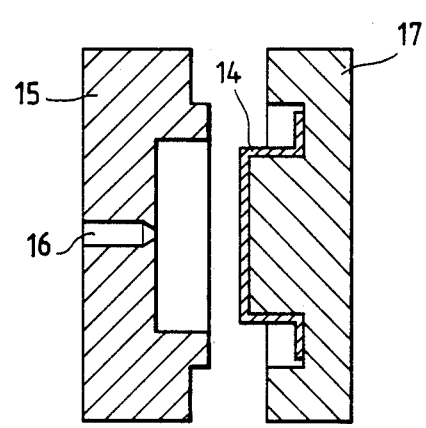
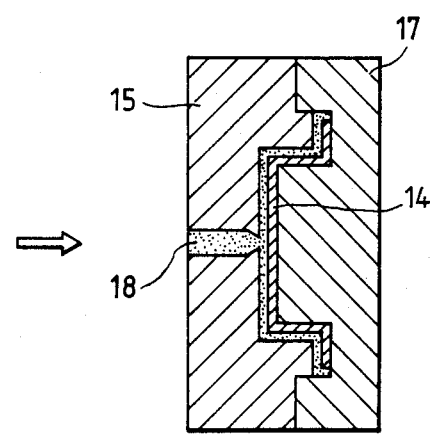

CONTAINER

BACKGROUND OF THE INVENTION

This invention relates to containers, and more particularly to a plastic container used, for instance, as a can for packing food.

Metal cans (or tin cans) have been extensively use for packing, for instance, food; however, recently the tendency is decreased, because metal cans are cold, poor in appearance, and adversely affect the taste or flavor of the food therein.

Therefore, there has been a strong demand for the provision of cans which are made of other materials and are free from the above-described difficulties. In order to meet this requirement, a multi-layer film comprising an aluminum foil and a plastic layer formed on the alter has been used to form a container; that is, a cup-shaped container for packing contents such as for instance food has been formed by using a flat-plate-shaped multi-layer film (in the form of a sheet).

One of the conventional method of forming a cup-shaped container or container body by using such a flat-plate-shaped multi-layer film is a drawing method. In the drawing method, with the periphery of the multi-layer film clamped on the stand, pressure is applied to the film from above to draw the latter downwardly, to thereby form a container body deep enough to receive the contents. Normally, the operation is carried out by press cold drawing.

The method is disadvantageous in that since the multi-layer film is drawn, the aluminum foil becomes nonuniform in thickness, and is liable to have pin holes or cracks, and accordingly it is not practical to use a thin aluminum foil; that is, an aluminum foil as thick as 60 to 100μ must be used with a result that the can manufacturing cost is increased as much. Furthermore, since the aluminum foil is drawn, it is impossible to form a deep container.

In addition, it is difficult to increase the wall thickness of the container, and accordingly the resultant container is liable to be deformed when sue or transported.

Another example of the method of forming a cup-shaped container body by using the flat-plate-shaped multi-layer film is as follows: The film is cut into film pieces having predetermined configurations, and the film pieces are bonded together with an adhesive or the like to form the container body. However, the method is disadvantageous in that, when the container is filled with contents such as food, the edges of the film pieces; i.e. the edges of the metal foil and adhesive layers contact the contents; that is, the method is not acceptable in food hygiene. In addition, the container formed according to the method cannot sufficiently withstand retort sterilization.

In view of the foregoing, the present inventors have proposed the following method of forming a cup-shaped container body by suing a multi-layer base material such as the above-described multi-layer film: In the method, a cup-shaped container base is formed before the container body. If the multi-layer base material is not drawn nor cut to form the cup-shaped container base, then unavoidably it will have unnecessary portions which do not contribute to the formation of the container base. However, in the method, the unnecessary portions of the multi-layer base material are absorbed as wrinkles. That is, in the formation of the container base, the multi-layer base material is not subjected to drawing. And, a resin layer is formed on the outer surface of the container base by injection molding, to form the container body. In this operation, the wrinkles are flattened and smoothed by the resin injecting pressure. Hereinafter, the method will be referred to as "a proposed method", when applicable, for convenience in description.

That is, the specific feature of the container body proposed by the applicant previously resides in that the multi-layer base material comprises an intermediate layer which is a metal foil layer, and resin layers formed on both sides of the intermediate layer which are molten when heated, and it is deformed into a cup-shaped container base with its bottom and its cylindrical wall wrinkled being substantially not drawn, and the resin layer is formed on the outer surface of the container base by injection molding (cf. Japanese Patent Application No. 34649/1985). In one example of the above-described method of forming a container body by using the multi-layer base material, the multi-layer base material which is for instance in the form of a disc is placed between a male and a female metal mold which are vertical grooves, and then the male metal mold is pushed into the female metal mold, to form a container base. The container base thus formed is in the form of a cup with a flange having wrinkles extended vertically. The method is advantageous in the following points:

(1) As was described above, the multi-layer base material is set between the male and female metal molds, and it is slid into the female metal mold by pressing the male metal mold to form a container base, and in this operation, unlike the conventional method, the multi-layer base material is substantially not drawn. Therefore, the method can provide a container body mode of a multi-layer plastic base material having an aluminum foil as thin as less than 40μ, which cannot be formed by the conventional method.

That is, in the conventional method using drawing, pin holes or cracks are formed in a thin aluminum foil. On the other hand, in the above-described method, being free from such a difficulty, a thin aluminum foil can be used to form the container base; that is, the thickness of the aluminum foil can be minimized.

When an aluminum foil is merely drawn, then it becomes non-uniform in thickness. However, in the method proposed by the applicant, the metal foil (or aluminum foil) of the container abase uniform in thickness. Therefore, the metal foil which is most important in forming the multi-layer base material can be minimized in thickness with its barrier characteristic maintained unchanged, and the manufacturing cost can be accordingly reduced. For the same reason, the container formed according to the method can be completely burnt out, and the therefore the so-called "public hazard of cans" can be eliminated.

(2) Furthermore, in forming a cup-shaped container base by using a flat-plate-shaped multi-layer base material according to the proposed method, unavoidably a part of the multi-layer base material becomes unnecessary. However, in the proposed method, the unnecessary part is absorbed as wrinkles. The container base with the wrinkles is subjected to injection molding. Therefore, it is unnecessary to draw the multi-layer base material. Furthermore, the inner surface of the container base is pushed against the metal mold by the resin injecting pressure, as a result of which the wrinkles are flattened and smoothed. In the proposed method, unlike the conventional method in which the film is cut into film pieces, and the film pieces are connected together with adhesive or the like to form a container body, the cut edge of the container body will not contact the contents therein. Thus, it can be said that the container body is excellent in food hygiene. Furthermore, the injected resin layer, being formed by injection molding, is positively joined to the outer surface of the container base. Thus, the resultant container body is high in mechanical strength. Accordingly, the container bodies are prevented from being deformed or collapsed when transported or stacked; that is, they are highly appreciated in practical used. And, for the same reason, the sealed container can sufficiently withstand the retort sterilization.

(3) The container base formed according to the proposed method has the resin layer, which is molten when heated, on its side which is opposite to the side covered with the injected resin layer. That is, the container body is excellent in heat sealing characteristic. Therefore, a lid formed of a suitable material can be readily welded to the container body, to form a sealed container. The sealed container thus formed can be subjected to retort sterilization, and can be stored for along period being excellent in gas barrier characteristic. Thus, the container can be widely used for packing food, soup, drink, etc.

(4) In addition, both sides of the multi-layer base material used to form the container are the resin layers. Therefore, the container formed according to the proposed method is free from the difficulty accompanying a conventional metal can that it will adversely affect the flavor of the food therein. Furthermore, the external appearance of the container can be improved by using other resins or changing the configuration.

The container body formed according to the proposed method, unlike the container (body) formed by using only resin injected or merely by three-dimensionally deforming the multi-layer base material, is made up of the container base formed by using the multi-layer base material and the resin layer formed by injection molding. Therefore, if the injection molding method is suitably modified, then the injected resin layer may be so formed that it forms an injected resin flange around the outer periphery of the flange of the container base; that is, the injected resin flange and the flange of the container base form a lid sealing region (cf. the specification of the aforementioned Japanese Patent Application No. 34649/1985).

If summarized, the container according to the proposed method is advantageous in that it can be stored for along period and can be subjected to retort sterilization, and if the lid is firmly welded to the container body, the container will not be broken or blasted if dropped or during retort sterilization. However, it is still disadvantageous in that it is rather difficult to peel the lid off the container when it is required to open the container; that is, it is low in so-called "easy peeling characteristics".

This difficulty may be eliminated by weakly welding the lid to the container body. However, this will cause another difficulty that, when the container is dropped or subjected to retort sterilization, the lid may peel off.

SUMMARY OF THE INVENTION

Accordingly, an object of this invention is to improve the above-described conventional container having a variety of advantages as described above so that the lid can be readily peeled off although being high in sealing strength.

Another object of the invention is to improve the above-described conventional container in which the flange of the container base and the injected resin flange form the lid sealing region, with the above-described advantages thereof maintained unchanged.

The foregoing objects and other objects of the invention have been achieved b the provision of a can-shaped container comprising: a container body including a container base having a cylindrical wall, a bottom and a flange, the container base being formed by using a flat-plate-shaped multi-layer base material made up of at least three layers, that is, an intermediate layer and thermally weldable resin layers formed on both sides of the intermediate layer in such a manner that wrinkles are formed in the cylindrical wall along the axis thereof, and a injected resin layer formed on the outer surface of the container base by injection molding in such a manner that the injected resin layer extends from the outer periphery of the flange of the container base, thus forming an injected resin flange, the two flanges forming a lid sealing region; and a lid thermally welded the lid sealing region of the container body, in which, according to the invention, the outer periphery of the flange of the container base is located at least 1 mm inwardly away from the outer periphery of the injected resin flange, and the sealing strength of the flange of the container base with the lid is greater than the sealing strength of the injected resin flange with the lid.

In the lid sealing region of the can-shaped container according to the invention, the sealing strength of the flange of the container base is higher than that of the injected resin flange of the injected resin layer covering the container base; that is, the sealing strength of the outer annular portion of the lid sealing region is small, whereas that of the inner annular portion thereof is large. Therefore, peeling the lid from the container can be started with a relatively small force. Once the lid is peeled off at the edge of the container body, it can be peeled off the container body by the lid peeling inertia. The inventors have found it through intensive research that the easy peeling characteristic depends on how small the force used to peel the lid from the edge of the container body is.

Therefore, even if the sealing strength of the inner annular portion of the lid sealing region is relatively high, the lid can be readily peeled off the container body, because the sealing strength of the outer annular portion is smaller.

On the other hand, the fact that inner annular portion of the lid sealing region is greater in sealing strength is advantageous when the sealed container is subjected to retort sterilization or dropped, because in such a case the pressure in the sealed container is increased.

In the can-shaped container according to the invention, the outer periphery of the flange of the container base is located at least 1 mm inwardly away from the outer periphery of the injected resin flange of the injected resin layer covering the container base. This is based on the fact that if the flange, high in peeling strength, of the container base is large in area whereas the injected resin flange, low in sealing strength, of the injected resin layer is small in area, then the sealed container can more effectively withstand the pressure applied thereto when subjected to retort sterilization or dropped; however, its easy peeling characteristic is lowered.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In the accompanying drawings:

FIG. 4 is a sectional view showing the structure of a multi-layer base material used to form the container according to the invention;

FIG. 5 is a perspective view showing the multi-layer base material in the form of a disc;

FIG. 6 is an explanatory diagram for a description of a method of forming a container base by using the disc according to the invention;

FIG. 7 is a perspective view showing the container base formed according to the invention, which has wrinkles;

FIG. 8 is a sectional view showing the container base set in a metal mold;

FIG. 9 is a sectional view for a description of a method of forming a resin layer on the container base by injection molding, to form a container body;

The part (a) of FIG. 10 is a sectional view of the container base, and the part (b) of FIG. 10 is a sectional view of the container body covered with al id; i.e., one example of a can-shaped container according to the invention.

DETAILED DESCRIPTION OF THE INVENTION

Preferred embodiments of this invention will be described with reference to the accompanying drawings.

Figure 2:
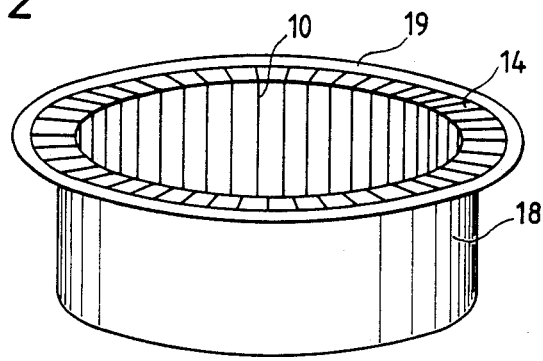
FIG. 2 is a perspective view of one example of a container body of the can-shaped container according to the invention.
Figure 3:
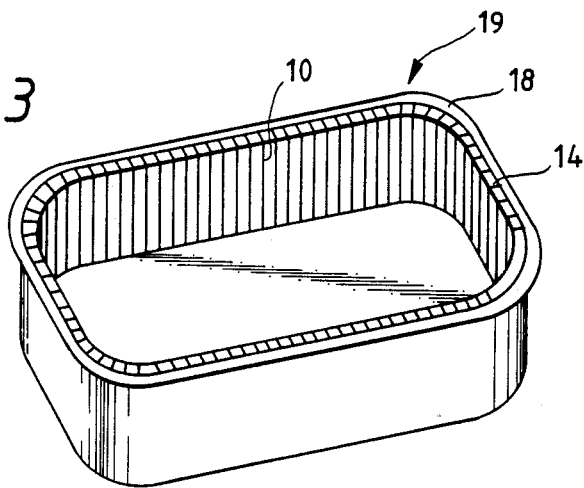
FIG. 3 is a perspective view of another example of the container body according to the invention.

One example of a container body; that is, a round can body is as shown in FIG. 2.

A method of manufacturing the container body will be described. First, a disc as shown in FIG. 5 is formed by stamping out a multi-layer base material 1 as shown in FIG. 4

The multi-layer base material 1 comprises: an intermediate layer 3 made of a metal foil layer, for instance, less than 40μ in thickness; a resin layer 4 formed on one side (or the upper surface) of the intermediate layer 3; and another resin layer 5 formed on the other side (or the lower surface) of the intermediate layer 3. The resin layers 4 and 5 are molten (or made adhesive to other materials) when heated.

As shown in FIG. 6, the disc 2 is placed between a female metal mold 9 having vertical grooves 7 formed in the inner wall and a male metal mold 8 having vertical grooves 6 formed in an outer wall and a flange-shaped flat plate (not shown). Under this condition, the male metal mold 8 is pushed into the female metal mold 8 in such a manner that the marginal part of the disk 2 made of the multi-layer base material is absorbed as vertical wrinkles 10, as shown in FIG. 7. Thus, a container base 14 having a flange 12, a cylindrical wall 12 and a bottom 13 has been formed with the multi-layer base material being substantially not drawn. In this operation, it goes without saying that the male and female metal molds 8 and 9 are so arranged that their grooves 6 and 7 are engaged with each other.

Figure 10A:
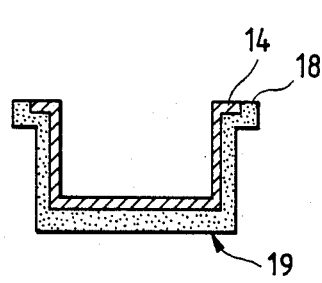

The container base 14 thus formed is placed on the male mold 15 in an injection molding machine as shown in FIG. 8 and is then clamped with a metal mold 17 having a gate 16 as shown in FIG. 9. Under this condition, a resin is injected through the gate of the metal mold 17 so as to form a resin layer 18, and the resin layer thus formed is bonded to the outer surface of the container base 14 as shown in FIG. 10A. Thus, a rigid container body 19 has been formed. The external appearance of the rigid container body 19 is as shown in FIG. 2.

In the injection of resin, the inner surface of the container base 14 is pushed against the metal mold 15 by the resin injecting pressure, so that the wrinkles 10 formed therein are smoothed. The smoothing of the wrinkles 10 is as indicated by the heavy lines in FIG. 7 and by the thin lines in FIG. 2.

Figure 10B:
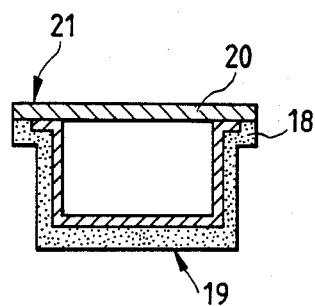
Figure 11:
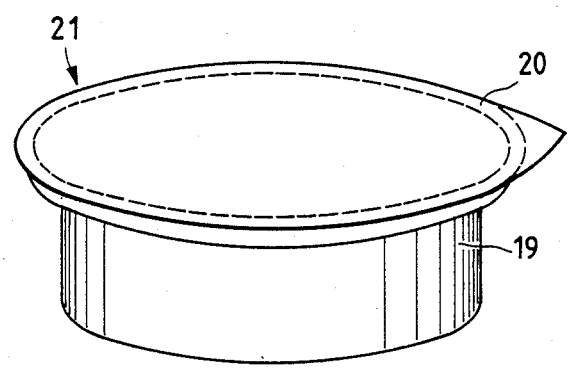
FIG. 11 is a perspective view of the can-shaped container shown in the part (b) of FIG. 10.

As shown in FIG. 10B and in FIG. 11, a lid is welded to the container body 19 thermally, for instance, by heat sealing. Thus, a sealed container 21 has been formed.

The sealed container according to the invention will be described with reference to FIG. 1 in more detail.

Figure 1:
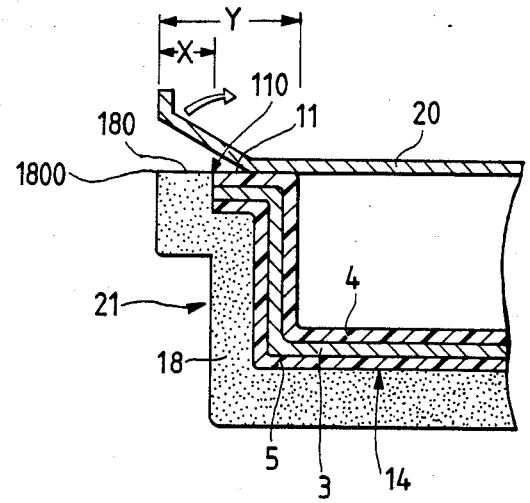
FIG. 1 is a sectional view showing essential components of a can-shaped container according to this invention.

As shown in FIG. 1, the injected resin layer 18 is formed on the thermally weldable resin layer 5 of the container base 14. In this operation, a flange 180 is formed with the same resin injected (hereinafter referred to as "an injected resin flange 180", when applicable) in such a manner that it surrounds the periphery 110 of the flange 11 of the container base 14, and is flush with the flange 11 of the container base 14. The upper surfaces of these flanges 110 and 11 form a lid sealing region Y. The lid sealing region Y is used to thermally weld the lid 20 to the container body 19.

It goes without saying that the periphery 110 of the flange 11 of the container base 14 is inside the periphery 1800 of the injected resin flange 180.

Ideally in molding, the periphery 11 of the container base 14 should be the edge of the multi-layer base material forming the container base 14. On the other hand, during the formation of the injected resin layer, a part of the injected resin may flow over the flange 11 of the container base 14; however, it will not affect the effects of the invention at all.

In practice, the periphery 110 of the flange 11 is located at least 1 mm away from the periphery 1800 of the injected resin flange 180; that is, the distance between those peripheries 110 and 1800 is at least 1 mm.

In the invention, the sealing strength of the flange 11 and the lid 20 is larger than that of the injected resin flange 180 and the lid 20. In other words, the sealing strength of the injected resin layer 18 and the lid 20 is larger than that of the lid 20 and the flange 11 of the container base 14 embraced by the injected resin layer 18.

That is, the lid sealing region Y has two different sealing strengths. This may be achieved, for instance, by the following method: The synthetic resin forming the resin layer 4 and accordingly the flange 11 of the container base 14 is made different in characteristic from that forming the injecting resin layer 18. For instance, a synthetic resin having a melting point of 40° C. is employed for the former, and a synthetic resin having a molting point of 160° C. for the latter.

Therefore, for instance when the heat sealing of the lid 20 is carried out at a temperature 180° C., the former is first molten to achieve the heat sealing, and thereafter the latter is molten when heated to a temperature of 160° C. to accomplish the heat sealing, as a result of which the sealing strength of the injected resin flange 180 and the lid 20 is smaller than that of the flange 11 of the container base 14 and the lid 20. Therefore, when the lid 20 i pulled in the direction of the arrow in FIG. 1, it can readily be peeled off the injected resin flange 180. When the lid 20 has been is peeled off the injected resin 180, then it is peeled off the flange 11 by the peeling force. That is, the lid 20 is peeled off the flanges 180 and 11 successively.

When the container 21 filled with contents (not shown) is subjected to retort sterilization, the force of breaking the seal is produced mainly by the expansion of the contents or an external pressure applied thereto. Therefore, it is essential that the sealing strength of the flange 11 and the lid 20 is so high that the container 21 may be sufficiently withstand the retort sterilization. In this case, even when the internal pressure in the container 21 is increased during retorting, it will never be blasted. This can be said to the case when the container filled with contents is dropped.

The reason why the distance X is set to at least 1 mm resides in that it is necessary that the retort sterilization withstanding characteristic and the easy peeling characteristic of the container are compatible with each other, and that the careless raising of the lid 20 from the injected resin flange 180 is prevented.

In the above-described embodiment, in order to make the selling strength of the lid 20 and the flange 11 and that of the lid 20 and the flange 180 different from each other, the synthetic resins different in melting point are employed; however, it should be noted that the invention is not limited thereto or thereby. The same object may be achieved, for instance, by adjustment of heat sealing start temperature.

Now, the materials forming the container body according to the invention will be described. A variety of metal materials may be employed to form the metal foil layer 3 of the multi-layer base material 1; however, in view of the objects of the invention, it si preferable to use an aluminum foil.

The metal foil layer 3 should be less than 100$\mu$ in thickness; however, since the disc 2 is not drawn in the formation of the container base 14; that is, the multi-layer base material, and especially the metal foil base is maintained unchanged in thickness in the formation of the container base, a metal foil considerably small in thickness can be employed. Thus, it is preferable to use a metal foil less than 50$\mu$ in thickness because it is relatively economical and inflammable. For instance, a metal foil 7$\mu$ in thickness can be used to form the container body.

A variety of resins such as synthetic resins may be employed to form the resin layers 4 and 5 of the multi-layer base material 1. Typical examples of the synthetic resins are polyolefin synthetic resins such as for instance ethylene propylene copolymers which are excellent in the heat resisting characteristic, oil resisting characteristic and heat sealing characteristic which are required when the container is subjected to retort sterilization under higher pressure and at high temperature, and in which no plasticizer or stabilizer is transferred from the resin into the food therein.

A variety of materials such as synthetic resins may be employed to form the injected resin layer 18. Typical examples of the synthetic resins are polyolefin synthetic resins such as polypropylene and ethylene polypropylene copolymer which shows high heat resistance against the high temperature provided when the container is subjected, for instance, to retort sterilization.

As was described above, in order to make different in sealing strength the flanges 11 and 180 forming the lid sealing region Y, the method is employed in which the materials forming the two resin layer 4 of the multi-layer base material 1 and the injected resin layer 18 are made of different materials. In a concrete example of the method, the resin layer 4 is formed by using ethylene propylene random copolymer 140° C. in melting point, whereas the injected resin layer 18 is formed by using ethylene propylene block polymer 160° C. in melting point.

In the invention, the resin to be injected may be mixed with a non-organic filer. This will provide the following advantages:

(1) The container is improved in dimensional stability; tat is, its contraction percentage is decreased.

(2) The container is improved in heat resistance; that is, its thermal deformation temperature is increased. This is advantageous when it is subjected to retort sterilization.

(3) The container used can be burnt with a small quantity of heat, and therefore the furnace for burning the containers is scarcely damaged. That is, the containers used can be economically disposed.

(4) The container is improved in thermal conduction, so that it can be readily retort-sterilized.

(5) The manufacturing cost of the container is reduced.

The non-organic filler may be a synthetic resin or that which is extensively used in the field of rubber. However, the non-organic compounds which are excellent in food hygience and will not react with oxygen gas or water and which are not decomposed when kneaded or molded are generally employed as the non-organic fillers. The non-organic fillers are roughly divided into compounds such as metal oxides their hydrates (hydroxides), sulfides, carbonates and silicates, their double salts, and their mixtures. Typical examples of the non-organic fillers are aluminum oxide (alumina), its hydrate, calcium hydroxide, magnesium oxide (magnesia), magnesium hydroxide, zinc oxide (zinc white), lead oxide such as minimum or white lead, magnesium carbonate, calcium carbonate, basic magnesium carbonate, white carbon, asbestos, mica, talc, glass fiber, glass powder, glass beads, cray, diatom earth, silica, iron oxide, antimony oxide, titanium oxide (titania), lithopone, pumice, aluminum sulfide (gypsum), zirconium silicate, zirconium oxide, barium carbonate, dolomite, molybdenum disulfide, and iron sand. Of these non-organic fillers, one in the form of powder should be 20$\mu$ or less (preferably 10$\mu$ or less) in diameter, one in the form of fibers should be 1 to 500$\mu$ (preferably 1 to 300$\mu$) in diameter and 0.1 to 6 mm (preferably 0.1 to 5 mm) in length, and one in the form of a flat plate should be 30$\mu$ or less (preferably 10$\mu$ or less). Of these non-organic fillers, the one in the for of a flat plate (or flake) and the one in the form of powder are more suitable for the resin to be injected.

Additives such as pigments may be added to the resin to be injected.

One example of the lid 20 of the sealed container is made of a multi-layer base material having at least two layers; a metal foil layer, and a resin layer formed thereon which can be thermally welded to the injected resin layer 18 of the container body 19 and can be peeled off the container body 19 when necessary.

The metal foil layer may be made of the same material as the above-described metal foil layer 3 of the multi-layer base material 1; that is its may be made of an aluminum foil. The resin layer of the lid may be formed by using olefin synthetic resin such as ethylene propylene copolymer which, as was described above, shows high heat resistance during retort sterilization. One preferred example of the synthetic resin is a blend of ethylene propylene random copolymer 60% and low density polyethylene 40%.

A preferred example of the lid 20 is of a sandwich structure comprising an intermediate layer of metal foil, a polyolefin synthetic resin layer formed on one side (facing the container body) of the intermediate layer, and a resin layer of polyester formed on the other side (outer side) of the intermediate layer.

Another example of the lid 20 is disclosed by Japanese Patent Application Nos. 90750/1983, 104185/1983, 146943/1984 or 146944/1984. It is as shown in FIGS. 12 and 13, and can be readily opened.

(1) In the lid sealing region of the container of the invention, the outer periphery of the flange of the container base is at least 1 mm inwardly away from the outer periphery of the injected resin flange of the injected resin layer covering the container base, and the sealing strength of the former flange is greater than that of the latter flange. Therefore, the lid is positively welded to the container body, and it can be readily peeled from it when necessary.

As was describe above, in the lid sealing region, the sealing strength of its outer annular portion is lower than hat of its inner annular portion. Therefore, once the outer annular portion relatively low in sealing strength is peeled off, the succeeding inner annular portion relatively high in sealing strength can be also readily peeled off.

On the other hand, the lid is positively welded to the container body. Therefore, the sealed container will never be broken or blasted when dropped or subjected to retort sterilization.

The container of the invention which is high in sealing strength and can be readily opened as described above, unlike a container formed by using only one and the same material or only a multi-layer base material, can be obtained by employing the multi-layer base material and the injected resin layer which are different in heat sealing characteristic for the lid sealing part of the container body.

(2) As shown in FIG. 6, the multi-layer base material is set between the male and female metal molds. Under this condition, the male metal mold is pushed into the female metal mold, so that the flat-plate-shaped multi-layer base material s deformed into a cup-shaped container substantially without being drawn, unlike the conventional drawing operation. Therefore, the invention can provide the noble container body which is made of a multi-layer plastic base material having a metal foil layer such as an aluminum foil layer less than 40μ in thickness.

In the conventional drawing method, pin holes or cracks are formed in a thin aluminum foil. On the other hand, in the invention, being free from such a difficulty, a thin aluminum foil can be used to form the container body; that is, the thickness of the aluminum foil can be minimized.

When an aluminum foil is merely drawn, then it becomes non-uniform in thickness. However, in the invention, the metal foil (or aluminum foil) of the container body is uniform in thickness. Therefore, the metal foil which is most important in forming the multi-layer base material can be minimized in thickness, as a result of which the manufacturing cost is reduced as much. For the same reason, the container of the invention can be completely burnt out, and therefore the so-called "public hazard of cans" can be eliminated.

(3) In forming a cup-shaped container base by using a fat-plate shaped multi-layer base material, unavoidably a part of the multi layer base material becomes unnecessary. In this invention, that unnecessary part is absorbed as wrinkles. That is, the container base with the wrinkles is subjected to injection molding. Therefore, in the invention, it is unnecessary to draw the multi-layer base material. Furthermore, the inner surface of the container base is pushed against the metal mold during the injection molding, as a result of which the wrinkles are flattened and smoothed. In the method of the invention, unlike the conventional method in which a film is suitably cut into film pieces, add the film pieces are connected together with adhesive or the like to form a container body, the cut edge will not contact with the contents in the container. Thus, it can be said that the container of the invention is excellent in food hygiene. Furthermore, the injected resin layer, being formed by injection molding, is positively joined to the outer surface of the container base. Thus, the resultant container body is high in mechanical strength. Accordingly, the container bodies of the invention are prevented rom being deformed or collapsed when transported or stacked; that is, they are highly appreciated in practical use. And, for the same reason, the sealed containers can sufficiently withstand the retort sterilization.

(4) Since, as was described above, the polyolefin synthetic resin layer is formed on the outer surface of the container base to form the container body, the lid can be readily welded to the latter by heat sealing to provide a lid-sealed container. The lid-sealed container thus formed can be subjected to retort sterilization, and can be stored for a long period being excellent in gas barrier characteristic. Therefore, the containers of the invention can be widely used as cans for packing food, soup, during and so forth.

(5) In addition, both sides of the multi-layer base material used to form the container according to the invention are the resin layers. Therefore, the container of the invention is free from the difficulty accompanying a conventional metal can that it will adversely affect the flavor of the food therein. Furthermore, the external appearance of the container can be improved by using other resins or changing the configuration.

What is claimed is:

1. A can-shaped container comprising: a container body including a container base having a side wall, a bottom and a flange, said container base being formed by using a flat-late shaped multi-layer base material including an intermediate layer and thermally weldable resin layers formed o both sides of said intermediate layer in such a manner that wrinkles are formed in said side wall along the axis thereof, and an injected resin layer formed on the outer surface of said container base by injection molding in such a manner that said injected resin layer extends from the outer periphery of said flange of said container base, thus forming an injected resin flange, said two flanges forming a lid sealing region; and a lid thermally welded to said lid sealing region of said container body.

2. The container of claim 1, wherein the outer periphery of said flange of said container base is located at least 1 mm inwardly away from the outer periphery of said injected resin flange.

3. The container of claim 1, wherein the sealing strength of said flange of said container base with said lid is greater than the sealing strength of aid injected resin flange with said lid.

4. The container of claim 1, wherein an offer surface of said flange of said container base is substantially flush with an offer surface of said injected resin flange.

* * * * *